(12) United States Patent
Kim et al.

(10) Patent No.: US 10,367,226 B2
(45) Date of Patent: Jul. 30, 2019

(54) NA BASED SECONDARY BATTERY

(71) Applicants: SK INNOVATION CO., LTD., Seoul (KR); FIELD UPGRADING USA, INC., Denver, CO (US)

(72) Inventors: Jeong Soo Kim, Daejeon (KR); Young Shol Kim, Daejeon (KR); Je Hyun Chae, Daejeon (KR); Won Sang Koh, Daejeon (KR); June Soo Lee, Daejeon (KR)

(73) Assignees: SK INNOVATION CO., LTD., Seoul (KR); FIELD UPGRADING USA, INC., Denver, CO (US)

( * ) Notice: Subject to any disclaimer, the term of this patent is extended or adjusted under 35 U.S.C. 154(b) by 128 days.

(21) Appl. No.: 15/102,816

(22) PCT Filed: Dec. 10, 2013

(86) PCT No.: PCT/KR2013/011419
§ 371 (c)(1),
(2) Date: Jun. 8, 2016

(87) PCT Pub. No.: WO2015/088065
PCT Pub. Date: Jun. 18, 2015

(65) Prior Publication Data
US 2016/0315345 A1    Oct. 27, 2016

(51) Int. Cl.
*H01M 10/054* (2010.01)
*H01M 10/0562* (2010.01)
(Continued)

(52) U.S. Cl.
CPC ......... *H01M 10/054* (2013.01); *H01M 4/134* (2013.01); *H01M 4/136* (2013.01);
(Continued)

(58) Field of Classification Search
CPC ...... H01M 4/134; H01M 4/136; H01M 4/381; H01M 4/40; H01M 4/58; H01M 4/582;
(Continued)

(56) References Cited

U.S. PATENT DOCUMENTS 3,730,771 A    5/1973    Tannenberger et al.
4,069,372 A    1/1978    Voinov
(Continued)

FOREIGN PATENT DOCUMENTS

CA    2041632    11/1991
GB    2 267 454    12/1993
(Continued)

OTHER PUBLICATIONS

Office Action issued by the Japanese Property Office dated Oct. 3, 2017.
European Search Report issued by the European Patent Office dated Jun. 29, 2017.
Office Action issued by the Japanese Patent Office dated Jul. 17, 2018.
(Continued)

*Primary Examiner* — Brittany L Raymond
(74) *Attorney, Agent, or Firm* — IP & T Group LLP

(57) ABSTRACT

Provided is a Na based secondary battery including: an anode containing sodium or a sodium alloy; a cathode containing a metal halide, which is a halide of at least one metal selected from a group consisting of alkali metals, transition metals, and Groups 12 to 14 metals, and a solvent dissolving the metal halide; and a sodium ion conductive solid electrolyte separating the cathode and the anode from each other.

14 Claims, 2 Drawing Sheets

(51) Int. Cl.
  *H01M 4/134*   (2010.01)
  *H01M 4/136*   (2010.01)
  *H01M 4/38*    (2006.01)
  *H01M 4/40*    (2006.01)
  *H01M 4/58*    (2010.01)
  *H01M 4/66*    (2006.01)
  *H01M 4/80*    (2006.01)
  *H01M 10/39*   (2006.01)
  *H01M 4/02*    (2006.01)

(52) U.S. Cl.
  CPC ............. *H01M 4/381* (2013.01); *H01M 4/40* (2013.01); *H01M 4/58* (2013.01); *H01M 4/582* (2013.01); *H01M 4/66* (2013.01); *H01M 4/661* (2013.01); *H01M 4/663* (2013.01); *H01M 4/667* (2013.01); *H01M 4/806* (2013.01); *H01M 10/0562* (2013.01); *H01M 10/39* (2013.01); *H01M 2004/027* (2013.01); *H01M 2004/028* (2013.01); *H01M 2220/10* (2013.01); *H01M 2300/0068* (2013.01)

(58) Field of Classification Search
  CPC ........ H01M 4/66; H01M 4/661; H01M 4/663; H01M 4/667; H01M 4/802; H01M 2004/027; H01M 2004/028; H01M 10/0562; H01M 10/054; H01M 10/39; H01M 2220/10; H01M 2300/0068
  See application file for complete search history.

(56) References Cited

U.S. PATENT DOCUMENTS

| | | |
|---|---|---|
| 4,910,105 A | 3/1990 | Tilley et al. |
| 5,230,968 A | 7/1993 | Bones et al. |
| 5,972,533 A | 10/1999 | Coetzer et al. |
| 2003/0054255 A1 | 3/2003 | Hidaka et al. |
| 2010/0279165 A1 | 11/2010 | Lemmon et al. |
| 2010/0297537 A1 | 11/2010 | Coors et al. |
| 2011/0104526 A1* | 5/2011 | Boxley ............... H01M 2/1646 429/50 |
| 2012/0104990 A1 | 5/2012 | Boysen et al. |
| 2012/0141856 A1 | 6/2012 | Gordon et al. |
| 2012/0183829 A1 | 7/2012 | Kniajanski et al. |
| 2012/0219843 A1 | 8/2012 | Bogdan, Jr. et al. |
| 2014/0152265 A1* | 6/2014 | Northey ............... H01M 10/44 320/131 |

FOREIGN PATENT DOCUMENTS

| | | |
|---|---|---|
| JP | 2013510391 | 3/2013 |
| KR | 1020130075438 | 7/2013 |
| KR | 1020140032643 | 3/2014 |
| WO | WO 2012/061823 | 5/2012 |
| WO | WO 2012/075079 | 6/2012 |

OTHER PUBLICATIONS

Office Action issued by the Korean Patent Office dated Aug. 22, 2018.

* cited by examiner

NA BASED SECONDARY BATTERY

This application is a national stage application of PCT/KR2013/011419 filed on Dec. 10, 2013. The disclosure of each of the foregoing applications is incorporated herein by reference in its entirety.

TECHNICAL FIELD

The present invention relates to a Na based secondary battery, and more particularly, to a Na based secondary battery capable of operating at a low temperature and having a high output.

BACKGROUND ART

In accordance with a rapid increase in the use of renewable energy, the necessity for an energy storage device using a battery has rapidly increased. Among these batteries, a lead battery, a nickel/hydrogen battery, a vanadium battery, and a lithium battery may be used. However, since the lead battery and the nickel/hydrogen battery have significantly low energy density, they require a large space in order to store the same capacitance of energy therein. Further, in the case of the vanadium battery, the vanadium battery uses a solution containing a heavy metal which causes environmental contamination, and a small amount of materials may move between an anode and a cathode through a membrane separating the anode and the cathode from each other, which deteriorates performance, such that the vanadium battery cannot be commercialized on a large scale. The lithium battery having significantly excellent energy density and output characteristics is significantly advantageous in view of a technology. However, the lithium battery is disadvantageous in view of economic efficiency when being used as a secondary battery for large scale power storage due to the scarcity of a lithium source.

In order to solve this problem, many attempts to use a sodium resource sufficiently present on Earth, have been conducted. Among them, as disclosed in US Patent Laid-open Publication No. 20030054255, a sodium-sulfur battery having a form in which a beta alumina having selective conductivity for a sodium ion is used, an anode contains sodium, and a cathode contains sulfur has been currently used as a large scale power storage device.

However, in the existing Na based secondary battery such as the sodium-sulfur battery or a sodium-nickel chloride battery, conductivity thereof and melting points of battery compositions should be considered. For example, the sodium-nickel chloride battery has an operation temperature of at least 250° C. or more, and the sodium-sulfur battery has an operation temperature of at least 300° C. or more. Due to this problem, there are many disadvantages in terms of economical efficiency of manufacturing or operating the Na based secondary battery while maintaining a temperature and sealability of the battery and reinforcing the safety thereof. In order to solve the above-mentioned problem, a room-temperature Na based battery has been developed, but the output thereof is significantly low, such that the room-temperature Na based battery has significantly low competitiveness as compared with the nickel-hydrogen battery or the lithium battery.

RELATED ART DOCUMENT

Patent Document

US Patent Laid-open Publication No. 20030054255

DISCLOSURE

Technical Problem

An object of the present invention is to provide a new Na based secondary battery capable of operating at a low temperature and improving an output and charge and discharge speed of the battery.

Technical Solution

In one general aspect, a Na based secondary battery includes: an anode containing sodium or a sodium alloy; a cathode containing metal halide, which is a halide of at least one metal selected from a group consisting of alkali metals, transition metals, and Groups 12 to 14 metals, and a solvent dissolving the metal halide; and a sodium ion conductive solid electrolyte separating the cathode and the anode from each other.

In a discharge state, the cathode may include: a liquid-state component containing sodium halide; and a solid-state component containing at least one metal selected from a group consisting of the transition metals and Groups 12 to 14 metals.

The Na based secondary battery may be charged by a charge reaction according to the following Reaction Formula 1 and discharged by a discharge reaction according to the following Reaction formula 2 and include a liquid-state cathode in which sodium halide (NaX) and metal halide (MXm) of Reaction Formulas 1 and 2 are dissolved at the time of charging and discharging the battery.

$m$NaX+M→$m$Na+MX$_m$      (Reaction Formula 1)

$m$NaX+M←$m$Na+MX$_m$      (Reaction Formula 2)

Where, M is at least one metal selected from a group consisting of transition metals and Groups 12 to 14 metals, X is a halogen atom, and m is a natural number of 1 to 4.

The solvent may dissolve the entire metal halides.

The cathode may be in an entirely liquid state in a charge state.

The Na based secondary battery may further include a cathode current collector contacting the cathode to collect current and providing a current movement path to the outside.

The cathode current collector may contain at least one material selected from graphite, grapheme, titanium, copper, platinum, aluminum, nickel, silver, gold, and carbon nanotube.

The metal halide may be represented by the following Chemical Formula 1.

MX$_m$      (Chemical Formula 1)

Where, M is at least one selected from nickel (Ni), iron (Fe), copper (Cu), zinc (Zn), cadmium (Cd), titanium (Ti), aluminum (Al), and tin (Sn), X is at least one selected from iodine (I), bromine (Br), chlorine (Cl), and fluorine (F), and m is a natural number of 1 to 4.

The metal halide may be represented by the following Chemical Formula 2.

NaX      (Chemical Formula 2)

Where, X is at least one selected from iodine (I), bromine (Br), chlorine (Cl), and fluorine (F).

The cathode may contain the metal halide at a concentration of 0.5 to 10 M.

The sodium alloy may be a sodium-cesium alloy, a sodium-rubidium alloy, or a mixture thereof.

The solid electrolyte may be beta alumina or Na super ionic conductor (NASICON).

An operation temperature of the Na based secondary battery may be room temperature to 200° C.

The solvent may be a non-aqueous organic solvent, an ionic liquid, or a mixture thereof.

The solvent may be at least one selected from a group consisting of 1,2-ethanediol, 1,2-propanediol, 1,3-propanediol, 1,2-butanediol, 1,3-butandiol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, glycerol, ethylene glycol, diethylene glycol, triethylene glycol, tetraethylene glycol, polyethylene glycol, propylene glycol, dipropylene glycol, tripropylene glycol, polypropylene glycol, formamide, N,N-dimethyl formamide, N,N-dimethyl acetamide, N,N-diethyl acetamide, N,N-dimethyl trifluoroacetamide, hexamethylphosphoramide, acetonitrile, propionitrile, butyronitrile, α-terpineol, β-terpineol, dihydro terpineol, N-methyl-2-pyrrolidone (NMP), dimethylsulfoxide, pyrrolidine, pyrroline, pyrrole, 2H-pyrrole, 3H-pyrrole, pyrazolidine, imidazolidine, 2-pyrazoline, 2-imidazoline, 1H-imidazole, triazole, isoxazole, oxazole, thiazole, isothiazole, oxadiazole, oxatriazole, dioxazole, oxazolone, oxathiazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pteridine, phenazine, phenothiazine, phenoxazine, and acridine.

Advantageous Effects

According to the present invention, a Na based secondary battery is configured to include an anode containing sodium, a solid electrolyte having selective conductivity for sodium ions, and a liquid-state cathode containing metal halide and/or sodium halide, such that the battery may operate at a low temperature in a range from room temperature to 200° C. In addition, as electrochemical reactions of the battery is carried out by the liquid-state cathode, capacity of the battery may be significantly increased, and an active region at which the electrochemical reaction is carried out may be increased, thereby making it possible to significantly increase a charge/discharge speed of the battery and prevent internal resistance of the battery from being increased.

DESCRIPTION OF DRAWINGS

The above and other objects, features and advantages of the present invention will become apparent from the following description of preferred embodiments given in conjunction with the accompanying drawings, in which.

BEST MODE

Figure 1:
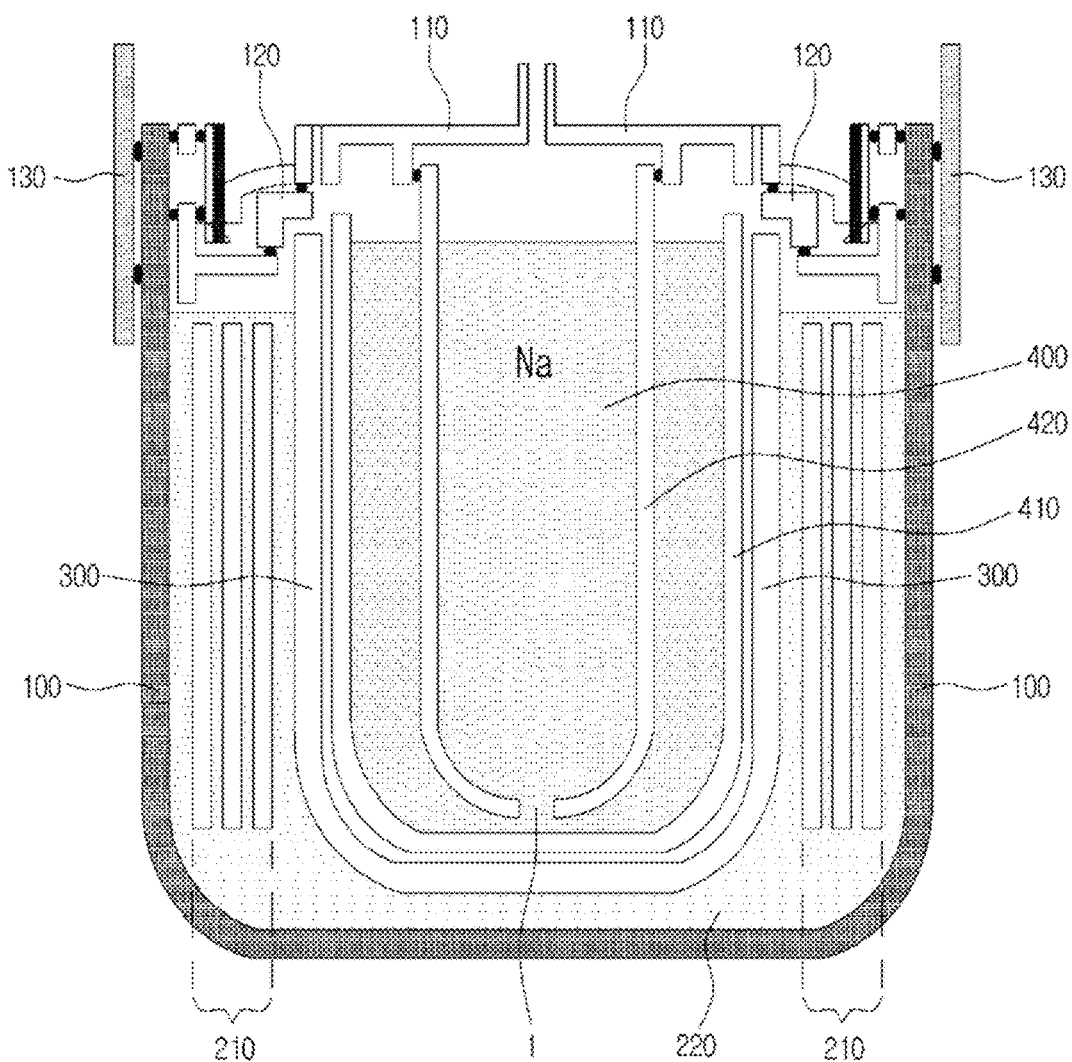
FIG. 1 is a view showing an example of a structure of a Na based secondary battery according to an exemplary embodiment of the present invention.

Hereinafter, a Na based secondary battery according to an exemplary embodiment of the present invention will be described in detail with reference to the accompanying drawings. The drawings to be described below are provided by way of example so that the idea of the present invention can be sufficiently transferred to those skilled in the art to which the present invention pertains. Therefore, the present invention is not limited to the drawings to be provided below, but may be modified in many different forms. In addition, the drawings to be provided below may be exaggerated in order to clarify the scope of the present invention. In addition, like reference numerals denote like elements throughout the specification.

Here, technical terms and scientific terms used in the present specification have the general meaning understood by those skilled in the art to which the present invention pertains unless otherwise defined, and a description for the known function and configuration obscuring the present invention will be omitted in the following description and the accompanying drawings.

The Na based secondary battery according to the present invention may contain halides of at least one metal selected from a group consisting of alkali metals, transition metals, and Groups 12 to 14 metals, and an electrochemical reaction of the battery is carried out by the halides in a dissolved state.

More specifically, the halide in the dissolved state may include alkali metal halides; and/or halides of at least one metal selected from the transition metals and Groups 12 to 14 metals. More specifically, the alkali metal may include lithium (Li), sodium (Na), and Potassium (K), the transition metal may include titanium (Ti), vanadium (V), chromium (Cr), manganese (Mn), iron (Fe), cobalt (Co), nickel (Ni), and copper (Cu), and Groups 12 to 14 metals may include zinc (Zn), aluminum (Al), cadmium (Cd), and tin (Sn). The dissolved state of the halide may mean a state in which the halide is dissolved in a solvent. The electrochemical reaction of the battery may mean a charge reaction, discharge reaction, or a charge and discharge reaction of the battery.

In more detail, the Na based secondary battery according to the present invention may include an anode containing sodium or a sodium alloy; a cathode containing a metal halide, which is a halide of at least one metal selected from the group consisting of the alkali metals, the transition metals, and Groups 12 to 14 metals, and the solvent dissolving the metal halide; and a sodium ion conductive solid electrolyte separating the cathode and the anode from each other.

Hereinafter, a halide of at least one metal selected from a group consisting of the transition metals and Groups 12 to 14 metals except for an alkali metal halide is referred to as the metal halide in the present specification, and the present invention will be described in detail.

The Na based secondary battery according to the exemplary embodiment of the present invention may include the anode, the cathode, and the solid electrolyte separating the anode and the cathode from each other, wherein the anode contains sodium, the solid electrolyte has selective conductivity for sodium ions, and the cathode may be a liquid-state cathode containing the metal halide. That is, in the Na based secondary battery according to the exemplary embodiment of the present invention, a cathode active material contains the metal halide, and the cathode may be a liquid-state in which the cathode active material is dissolved in the solvent.

More specifically, in the Na based secondary battery according to the exemplary embodiment of the present invention, the liquid-state cathode involved in a battery reaction may be contain a liquid-state cathode active material, wherein the liquid-state cathode active material may contain the metal halide dissolved in the solvent.

In detail, in the Na based secondary battery according to the exemplary embodiment of the present invention, the cathode may not contain a solid-state active material, more specifically, a solid-state metal halide, as the cathode active material involved in the battery reaction.

In this case, the cathode active material does not contain the solid-state active material, which may mean that an active material always maintaining a solid state is not intentionally injected or added at the time of charging and discharging the battery. Here, the solid state does not mean a solid state in which precipitates or deposits unintentionally generated during the battery reaction or degradation of the battery are contained. In more detail, the cathode active material does not contain a solid-state active material, which means that the cathode active material does not contain a metal halide always maintaining a solid state at the time of charging and discharging the battery.

In detail, in the Na based secondary battery according to the exemplary embodiment of the present invention, the cathode active material of the cathode may be in an entirely liquid state in a battery charge state, and the entirely liquid-state cathode active material may contain the metal halide.

The Na based secondary battery according to the exemplary embodiment of the present invention may include the anode, the cathode and the solid electrolyte separating the anode and the cathode from each other, wherein the anode may contain sodium, the solid electrolyte may have selective conductivity for the sodium ion, and the cathode may contain a liquid-state component containing sodium halide and a solid-state component containing at least one metal selected from the group consisting of the transition metal and Groups 12 to 14 metals. That is, in the Na based secondary battery according to the exemplary embodiment of the present invention, the cathode may contain the liquid-state component containing the sodium halide dissolved in the solvent and the solid-state component containing at least one metal selected from the group consisting of the transition metal and Groups 12 to 14 metals.

In detail, in the Na based secondary battery according to the exemplary embodiment of the present invention, in a battery discharge state, the liquid-state component involved in the battery reaction may be the liquid state in which the cathode active material containing the sodium halide is dissolved in the solvent, and the solid-state component may contain at least one metal selected from the group consisting of the transition metal and Groups 12 to 14 metals.

In more detail, in the Na based secondary battery according to the exemplary embodiment of the present invention, the metal halide may be formed by the reaction between the sodium halide in the liquid-state component and the metal in the solid-state component, wherein the reaction between the sodium halide and the metal may be the charge reaction of the battery. In this case, the metal halide, which is a product of the charge reaction, may be dissolved by the solvent configuring the liquid-state component of the cathode.

The Na based secondary battery according to the exemplary embodiment of the present invention may include the anode; the cathode; and the sodium ion conductive solid electrolyte separating the cathode and the anode from each other, wherein it is charged by a charge reaction according to the following Reaction Formula 1 and discharged by a discharge reaction according the following Reaction formula 2 and includes a liquid-state cathode in which the sodium halide and the metal halide in Reaction Formulas 1 and 2 are dissolved at the time of charging and discharging the battery.

$m\text{NaX}+M \rightarrow m\text{Na}+MX_m$ 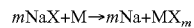 (Reaction Formula 1)

$m\text{NaX}+M \leftarrow m\text{Na}+MX_m$ 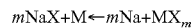 (Reaction Formula 2)

Where, M is at least one metal selected from the group consisting of the transition metals and Groups 12 to 14 metals, X is a halogen atom, and m is a natural number of 1 to 4. In detail, in Reaction Formulas 1 and 2, m may be a natural number corresponding to a positive valence of the metal M.

In detail, in the Na based secondary battery according to the exemplary embodiment of the present invention, the liquid-state cathode may contain the metal halide, the sodium halide, or the metal halide and the sodium halide, and contain the solvent in which the entire metal halide and sodium halide are dissolved. Therefore, the metal halide, which is the product of the charge reaction, and the sodium halide, which is the product of the discharge reaction, exist in the cathode in a state in which the entire metal halide and sodium halide are dissolved therein, such that the charge and discharge of the battery may be performed by the reaction between the liquid-state cathode and sodium (ion) moves through the solid electrolyte.

More specifically, in the Na based secondary-battery according to the exemplary embodiment of the present invention, the cathode may be a liquid-state cathode containing the metal halide and be in an entirely liquid-state, based on the charge state of the battery by the charge reaction according to the Reaction Formula 1. In addition, the cathode may include the liquid-state component containing the sodium halide and the solid-state component containing at least one metal selected from the group consisting of the transition metals and Groups 12 to 14 metals, based on the discharge state of the battery by the discharge reaction according to the Reaction Formula 2.

The Na based secondary battery according to the exemplary embodiment of the present invention may include the anode; the cathode; and the sodium ion conductive solid electrolyte separating the cathode and the anode from each other, wherein the anode may contain sodium, and the cathode may contain the solvent dissolving the entire sodium halide and metal halide. That is, in the Na based secondary battery according to the exemplary embodiment of the present invention, the cathode may contain the solvent dissolving the entire sodium halide and metal halide contained in the cathode as the product of the charge and/or discharge reaction.

In detail, the cathode may contain the active material containing the sodium halide, the metal halide, or the sodium halide and the metal halide; and the solvent dissolving the entire sodium halide and metal halide.

The Na based secondary battery according to the exemplary embodiment of the present invention may include the anode; the cathode; and the sodium ion conductive solid electrolyte separating the cathode and the anode from each other, wherein the anode may contain sodium, the cathode may be a liquid-state component (liquid-state cathode) containing ions of at least one metal selected from the group consisting of the transition metals and Groups 12 to 14 metals and halogen ions in the charge state, and contain the solid-state metal component electroplated with metal ions;

and the liquid-state component containing the sodium ion and the halogen ion in the discharge state.

As described above, in the Na based secondary battery according to the exemplary embodiment of the present invention, the active material (the sodium halide and/or metal halide) involved in the electrochemical reaction of the battery is present as the liquid-state component dissolved in the solvent, such that the battery may operate at a low temperature in the range from room temperature to 200° C., particularly 80 to 150° C., and more particularly 100 to 135° C. Therefore, an economical advantage in that resources of the Na based battery according to the related art may be easily secured may be maintained, and risks and operational difficulties due to the operation at a high temperature may be solved.

In addition, the active material (sodium halide and/or metal halide) involved in the electrochemical reaction of the battery exists in the liquid-state component dissolved in the solvent, such that an electrically active region at which the electrochemical reaction is carried out is not limited to an existing interface between a cathode solution and the solid-state cathode (electrode), but since the electrochemical reaction may be carried out in ail of the regions of the liquid-state cathode, the electrically active region may be significantly increased, thereby making it possible to increase the charge and discharge speed. Further, since an amount of active material (sodium halide and/or metal halide) dissolved in the solvent directly affects a capacity of the battery, the capacity of the battery may be easily designed by adjusting the amount of the active material (sodium halide and/or metal halide dissolved in the solvent and/or the liquid-state cathode (or liquid-state component of the cathode) provided in the secondary battery and significantly increased by increasing the amount of the active material (sodium halide and/or metal halide) dissolved in the solvent and/or an amount of the liquid-state cathode (or liquid-state component of the cathode) provided in the secondary battery.

Further, since reaction products of the charge and discharge reaction such as the metal halide and the sodium halide exist in the liquid state in which the reaction products are dissolved in the solvent instead of the solid state, it is possible to prevent internal impedance of the battery from being decreased by the products, and particularly, to prevent resistance of a current collector of the battery from being changed or increased.

In addition, since the battery may have excellent performance even at a low temperature, when the battery is designed so as to have the same output as that of the Na based battery according to the related art, it is possible to further efficiently and cheaply fabricate the battery.

As described above, the Na based secondary battery according to the exemplary embodiment of the present invention may be entirely in the liquid state in which the metal halide is dissolved in the solvent at the charge state and be in a state in which the sodium halide is dissolved in the solvent in the discharge state. In this case, the metal of the metal halide dissolved in the solvent of the cathode may be electroplated to thereby be deposited in the discharge state, which is caused by discharge, and this deposit of the metal may be dissolved in the solvent of the cathode during a charge process.

As described above, in the Na based secondary battery according to the exemplary embodiment of the present invention, the discharge reaction of the battery may be carried out between the liquid-state cathode containing the metal halide dissolved in the solvent and sodium of the anode, and the charge reaction of the battery may be carried out between the liquid-state component of the cathode containing the sodium halide dissolved in the same solvent and the metal electroplated during the discharge process. In this case, as described above, the cathode in the charge state may be liquid containing the solvent and the metal halide dissolved in the solvent, and the cathode in the discharge state may contain the metal of the metal halide electroplated and the sodium halide dissolved in the solvent in the discharge state.

That is, the Na based secondary battery according to the exemplary embodiment of the present invention may include the liquid-state cathode containing the metal ion and the halogen ion in the charge state, and include the cathode containing the liquid state component containing the sodium ion and the halogen ion; and the solid-state component containing the metal in the discharge state.

In the Na based secondary battery according to the exemplary embodiment of the present invention, the cathode may contain the solvent, wherein the solvent of the cathode may be a solvent dissolving the entire metal halide and sodium halide.

More specifically, in the Na based secondary battery according to the exemplary embodiment of the present invention, as the solvent of the cathode, any solvent may be used as long as the solvent may dissolve the sodium halide simultaneously with dissolving the metal halide, but a non-aqueous organic solvent, an ionic liquid, or a mixture thereof may be preferably used in view of improving ionic conductivity of sodium ion, stabilizing charge and discharge cycle characteristics, and improving preservation characteristics capable of preventing the self-discharge.

As the non-aqueous organic solvent, at least one selected from alcohol based solvents, polyol based solvents, heterocyclic hydrocarbon based solvents, amide based solvents, ester based solvents, ether based solvents, lactone based solvents, carbonate based solvents, phosphate based solvents, sulfone based solvents, and sulfoxide based solvents may be used, and as the ionic liquid, at least one selected from imidazoline based ionic liquids, piperidinium based ionic liquids, pyridinium based ionic liquids, pyrrolidium based ionic liquids, ammonium based ionic liquids, phosphonium based ionic liquids, and sulfonium based ionic liquids may be used.

In detail, in the Na based secondary battery according to the exemplary embodiment of the present invention, as an example of the non-aqueous organic solvent capable of stably maintaining the liquid state at an operation temperature and pressure of the secondary battery, easily diffusing the sodium ion introduced through the solid electrolyte, not generating undesired side-reactions, having stable solubility for the metal halide and sodium halide, stably performing the charge and discharge cycle for a long period time, and having excellent preservation characteristics, there is at least one organic solvent selected from a group consisting of 1,2-ethanediol, 1,2-propanediol, 1,3-propanediol, 1,2-butanediol, 1,3-butandiol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, glycerol, ethylene glycol, diethylene glycol, triethylene glycol, tetraethylene glycol, polyethylene glycol, propylene glycol, dipropylene glycol, tripropylene glycol, polypropylene glycol, formamide, dimethyl formamide, N,N-dimethyl acetamide, N,N-diethyl acetamide, N,N-dimethyl trifluoroacetamide, hexamethylphosphoramide, acetonitrile, propionitrile, butyronitrile, α-terpineol, β-terpineol, dihydro terpineol, N-methyl-2-pyrrolidone (NMP), dimethylsulfoxide, pyrrolidine, pyrroline, pyrrole, 2-pyrrole, 3H-pyrrole, pyrazolidine, imidazolidine, 2-pyrazoline, 2-imidazoline, 1H-imidazole, triazole, isoxazole, oxazole, thiazole, isothiazole, oxadiazole, oxatriazole, dioxazole, oxazolone, oxathiazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pteridine, phenazine, phenothiazine, phenoxazine, and acridine.

An example of the ionic liquid may include at least one solvent selected from a group consisting of 1-butyl-3-methylpyridinium bromide, 1-butyl-4-methylpyridinium bromide, 1-butylpyridinium bromide, 1-butyl-2-methylpyridinium bromide, 1-hexylpyridinium bromide, 1-ethylpyridinium bromide, 1-propyl-2-methylpyridinium bromide, 1-propyl-3-methylpyridinium bromide, 1-propyl-4-methylpyridinium bromide, 1-propylpyridinium bromide, 1-ethyl-2-methylpyridinium bromide, 1-ethyl-3-methylpyridinium bromide, 1-ethyl-4-methylpyridinium bromide, 1-ethylpyridinium iodide, 1-butylpyridinium iodide, 1-hexylpyridinium iodide, 1-butyl-2-methylpyridinium iodide, 1-butyl-1,3-methylpyridinium iodide, 1-butyl-4-methylpyridinium iodide, 1-propylpyridinium iodide, 1-butyl-3-methylpyridinium chloride, 1-butyl-4-methylpyridinium chloride, 1-butylpyridinium chloride, 1-butyl-2-methylpyridinium chloride, 1-hexylpyridinium chloride, 1-butyl-3-methylpyridinium hexafluorophosphate, 1-butyl-4-methylpyridinium hexafluorophosphate, 1-butylpyridinium hexafluorophosphate, 1-ethylpyridinium hexafluorophosphate, 1-hexylpyridinium hexafluorophosphate, 1-butyl-2-methylpyridinium hexafluorophosphate, 1-propylpyridinium hexafluorophosphate, 1-butyl-2-methylpyridinium trifluoromethanesulfonate, 1-butyl-3-methylpyridinium trifluoromethanesulfonate, 1-butyl-1-methylpyridinium trifluoromethanesulfonate, 1-hexylpyridinium trifluoromethanesulfonate, 1-butylpyridinium trifluoromethanesulfonate, 1-ethylpyridinium trifluoromethanesulfonate, 1-propylpyridinium trifluoromethanesulfonate, 1-butyl-3-methylpyridinium hexafluorophosphate, 1-butyl-4-methylpyridinium hexafluorophosphate, 1-butylpyridinium hexafluorophosphate, 1-hexylpyridinium hexafluorophosphate, 1-butyl-2-methylpyridinium hexafluorophosphate, 1-ethylpyridinium hexafluorophosphate, 1-propylpyridinium hexafluorophosphate, 1-ethylpyridinium bis(trifluoromethylsulfonyl)imide, 1-propylpyridinium bis(trifluoromethylsulfonyl)imide, 1-butylpyridinium bis(trifluoromethylsulfonyl)imide, 1-ethyl-3-methylpyridinium bis(trifluoromethylsulfonyl)imide, 3-methyl-1-propylpyridinium bis(trifluoromethylsulfonyl)imide, 1-butyl-3-methylpyridinium bis(trifluoromethylsulfonyl)imide, 1-ethyl-4-methylpyridinium bis(trifluoromethylsulfonyl)imide, 4-methyl-1-propylpyridinium bis(trifluoromethylsulfonyl)imide, 1-butyl-4-methylpyridinium bis(trifluoromethylsulfonyl)imide, 1-butyl-2-methylpyridinium bis(trifluoromethylsulfonyl)imide, 1-ethyl-2-methylpyridinium bis(trifluoromethylsulfonyl)imide, 2-methyl-1-propylpyridinium bis(trifluoromethylsulfonyl), 1-ethyl-3-methylimidazolium methylcarbonate, 1-butyl-3-methylimidazolium methylcarbonate, 1-ethyl-3-methylimidazolium tricyanomethanide, 1-butyl-3-methylimidazolium tricyanomethanide, 1-ethyl-3-methylimidazolium bis(perfluoroethylsulfonyl)imide, 1-butyl-3-methylimidazolium bis(perfluoroethylsulfonyl)imide, 1-ethyl-3-methylimidazolium dibutylphosphate, 1-butyl-3-methylimidazolium dibutylphosphate, 1-ethyl-3-methylimidazolium methyl sulfate, 1,3-dimethylimidazolium methyl sulfate, 1-ethyl-3-methylimidazolium ethyl sulfate, 1,3-diethylimidazolium ethyl sulfate, 1,3-dimethylimidazolium dimethyl phosphate, 1-ethyl-3-methylimidazolium dimethyl phosphate, 1-butyl-3-methylimidazolium dimethyl phosphate, 1-ethyl-3-methylimidazolium diethyl phosphate, 1,3-diethylimidazolium diethyl phosphate, 1-butyl-3-methylimidazolium hydrogen sulfate, 1-ethyl-3-methylimidazolium hydrogen sulfate, 1-butyl-3-methylimidazolium methanesulfonate, 1-ethyl-3-methylimidazolium methanesulfonate, 1-ethyl-3-methylimidazolium tosylate, 1-ethyl-3-methylimidazolium 1,1,2,2-tetrafluoroethanesulfonate, 1-methyl-3-propylimidazolium 1,1,2,2-tetrafluoroethanesulfonate, 1-butyl-3-methylimidazolium 1,1,2,2-tetrafluoroethanesulfonate, 1-benzyl-3-methylimdiazolium 1,1,2,2-tetrafluoroethanesulfonate, 1-butyl-3-ethylimidazolium 1,1,2,2-tetrafluoroethanesulfonate, 1-methylimidazolium 1,1,2,2-tetrafluoroethanesulfonate, 1-ethylimidazolium 1,1,2,2-tetrafluoroethanesulfonate, 1-ethyl-3-methylimidazolium thiocyanate, 1-butyl-3-methylimidazolium thiocyanate, 1-ethyl-3-methylimidazolium dicyanamide, 1-butyl-3-methylimidazolium dicyanamide, 1-allyl-3-methylimidazolium dicyanamide, 1-benzyl-3-methylimidazolium dicyanamide, 1-methyl-3-propylimidazolium iodide, 1-hexyl-3-methylimidazolium iodide, 1-ethyl-3-methylimidazolium iodide, 1,2-dimethyl-3-propylimidazolium iodide, 1-butyl-3-methylimidazolium iodide, 1-dodecyl-3-methylimidazolium iodide, 1-butyl-2,3-dimethylimidazolium iodide, 1-hexyl-2,3-dimethylimidazolium iodide, 1,3-dimethylimidazolium iodide, 1-allyl-3-methylimidazolium iodide, 1-butyl-3-methylimidazolium chloride, 1-allyl-3-methylimidazolium chloride, 1-(2-hydroxyethyl)-3-methylimidazolium chloride, 1,3-didecyl-2-methylimidazolium chloride, 1-hexyl-3-methylimidazolium chloride, 1-butyl-2,3-dimethylimidazolium chloride, 1-decyl-3-methylimidazolium chloride, 1-methyl-3-octylimidazolium chloride, 1-ethyl-3-methylimidazolium chloride, 1-methylimidazolium chloride, 1-hexadecyl-3-methylimidazolium chloride, 1-dodecyl-3-methylimidazolium chloride, 1-benzyl-3-methylimidazolium chloride, 1-methyl-3-tetradecylimidazolium chloride, 1-methyl-3-propylimidazolium chloride, 1-methyl-3-octadecylimidazolium chloride, 1-ethylimidazolium chloride, 1,2-dimethylimidazolium chloride, 1-ethyl-2,3-dimethylimidazolium trifluoromethanesulfonate, 1-ethyl-3-methylimidazolium trifluoromethanesulfonate, 1-butyl-3-methylimidazolium trifluoromethanesulfonate, 1-butyl-2,3-dimethylimidazolium trifluoromethanesulfonate, 1-decyl-3-methylimidazolium trifluoromethanesulfonate, 1-hexyl-3-methylimidazolium trifluoromethanesulfonate, 1-methyl-3-octylimidazolium trifluoromethanesulfonate, 1-dodecyl-3-methylimidazolium trifluoromethanesulfonate, 1-methylimidazolium trifluoromethanesulfonate, 1-ethylimidazolium trifluoromethanesulfonate, 1-methyl-3-propylimidazolium trifluoromethanesulfonate, 1-ethyl-3-methylimidazolium acetate, 1-butyl-3-methylimidazolium acetate, 1-ethyl-3-methylimidazolium trifluoroacetate, 1-butyl-3-methylimidazolium trifluoroacetate, 1-ethyl-3-methylimidazolium nitrate, 1-methylimidazolium nitrate, 1-ethylimidazolium nitrate, 1-butyl-3-methylimidazolium tetrachloroferrate(III), 1-ethyl-3-methylimidazolium bis(trifluoromethylsulfonyl)imide, 1-methyl-3-propylimidazolium bis(trifluoromethylsulfonyl)imide, 1-butyl-3-methylimidazolium bis(trifluoromethylsulfonyl)imide, 1-hexyl-3-methylimidazolium bis(trifluoromethylsulfonyl)imide, 1-methyl-3-octylimidazolium bis(trifluoromethylsulfonyl)imide, 1-decyl-3-methylimidazolium bis(trifluoromethylsulfonyl)imide, 1-dodecyl-3-methylimidazolium bis(trifluoromethylsulfonyl)imide, 1-methyl-3-tetradecylimidazolium bis(trifluoromethylsulfonyl)imide, 1-hexadecyl-3-methylimidazolium bis(trifluoromethylsulfonyl)imide, 1-butyl-2,3-dimethylimidazolium bis(trifluoromethylsulfonyl)imide, 1-ethyl-2,3-dimethylimidazolium bis(trifluoromethylsulfonyl)imide, 1,2-dimethyl-3-propylimidazolium bis(trifluoromethylsulfonyl)imide, 1,3-diethylimidazolium bis(trifluoromethylsulfonyl)imide, 1,3-dimethylimidazolium bis(trifluoromethylsulfonyl)imide, 1-methyl-3-octadecylimidazolium bis(trifluoromethylsulfonyl)imide, 1-allyl-3-methylimidazolium bis(trifluoromethylsulfonyl)imide, 1-benzyl-3-methylimidazolium bis(trifluoromethylsulfonyl)imide, 1-methylimidazolium bis(trifluoromethylsulfonyl)imide, 1-ethylimidazolium bis(trifluoromethylsulfonyl)imide, 1,2-dimethylimidazolium bis(trifluoromethylsulfonyl)imide, 1-ethyl-3-propylimidazolium bis(trifluoromethylsulfonyl)imide, 1-butyl-3-ethylimidazolium bis(trifluoromethylsulfonyl)imide, 1-ethyl-3-vinylimidazolium bis(trifluoromethylsulfonyl)imide, 1-butyl-3-vinylimidazolium bis(trifluoromethylsulfonyl)imide, 1-methyl-3-pentylimidazolium bis(trifluoromethylsulfonyl)imide, 1-heptyl-3-methylimidazolium bis(trifluoromethylsulfonyl)imide, 1-methyl-3-nonylimidazolium bis(trifluoromethylsulfonyl)imide, 1-butyl-3-methylimidazolium hexafluorophosphate, 1-hexyl-3-methylimidazolium hexafluorophosphate, 1-methyl-3-octylimidazolium hexafluorophosphate, 1-butyl-2,3-dimethylimidazolium hexafluorophosphate, 1-decyl-3-methylimidazolium hexafluorophosphate, 1-dodecyl-3-methylimidazolium hexafluorophosphate, 1-ethyl-3-methylimidazolium hexafluorophosphate, 1-ethyl-2,3-dimethylimidazolium hexafluorophosphate, 1-methyl-3-propylimidazolium hexafluorophosphate, 1-methyl-3-tetradecylimidazolium hexafluorophosphate, 1-hexadecyl-3-methylimidazolium hexafluorophosphate, 1-methyl-3-octadecylimidazolium hexafluorophosphate, 1-benzyl-3-methylimidazolium hexafluorophosphate, 1,3-diethylimidazolium hexafluorophosphate, 1-ethyl-3-propylimidazolium hexafluorophosphate, 1-butyl-3-ethylimidazolium hexafluorophosphate, 1-methyl-3-pentylimidazolium hexafluorophosphate, 1-heptyl-3-methylimidazolium hexafluorophosphate, 1-methyl-3-nonylimidazolium hexafluorophosphate, 1-ethyl-2,3-dimethylimidazolium tetrafluoroborate, 1-ethyl-3-methylimidazolium tetrafluoroborate, 1-butyl-3-methylimidazolium tetrafluoroborate, 1-hexyl-3-methylimidazolium tetrafluoroborate, 1-methyl-3-octylimidazolium tetrafluoroborate, 1-(2-hydroxyethyl)-3-methylimidazolium tetrafluoroborate, 1-butyl-2,3-dimethylimidazolium tetrafluoroborate, 1-decyl-3-methylimidazolium tetrafluoroborate, 1-hexadecyl-3-methylimidazolium tetrafluoroborate, 1-dodecyl-3-methylimidazolium tetrafluoroborate, 1-methyl-3-propylimidazolium tetrafluoroborate, 1-benzyl-3-methylimidazolium tetrafluoroborate, 1-methyl-3-octadecylimidazolium tetrafluoroborate, 1-methyl-3-tetradecylimidazolium tetrafluoroborate, 1,3-diethylimidazolium tetrafluoroborate, 1-ethyl-3-propylimidazolium tetrafluoroborate, 1-butyl-3-ethylimidazolium tetrafluoroborate, 1-methyl-3-pentylimidazolium tetrafluoroborate, 1-heptyl-3-methylimidazolium tetrafluoroborate, 1-methyl-3-nonylimidazolium tetrafluoroborate, 1-ethyl-3-methylimidazolium bromide, 1-butyl-3-methylimidazolium bromide, 1-butyl-2,3-dimethylimidazolium bromide, 1-decyl-3-methylimidazolium bromide, 1-hexyl-3-methylimidazolium bromide, 1-methyl-3-octylimidazolium bromide, 1-methyl-3-propylimidazolium bromide, 1-dodecyl-3-methylimidazolium bromide, 1-ethyl-2,3-dimethylimidazolium bromide, 1,2-dimethyl-3-propylimidazolium bromide, 1-methylimidazolium bromide, 1-ethylimidazolium bromide, 1,3-diethylimidazolium bromide, 1-ethyl-3-propylimidazolium bromide, 1-butyl-3-ethylimidazolium bromide, 1-ethyl-3-vinylimidazolium bromide, 1-butyl-3-vinylimidazolium bromide, 1-heptyl-3-methylimidazolium bromide, 1-methyl-3-nonylimidazolium bromide, 1-(2-hydroxy-2-methyl-n-propyl)-3-methylimidazolium methanesulfonate, 1-methyl-1-propylpiperidinium bis(trifluoromethylsulfonyl)imide, (1-butyl-1-methylpiperidinium bis(trifluoromethylsulfonyl)imide, 1-butyl-1-methylpiperidinium trifluoromethanesulfonate, 1-methyl-1-propylpiperidinium trifluoromethanesulfonate, 1-methyl-1-propylpiperidinium hexafluorophosphate, 1-butyl-1-methylpiperidinium hexafluorophosphate, 1-methyl-1-propylpiperidinium tetrafluoroborate, 1-butyl-1-methylpiperidinium tetrafluoroborate, 1-methyl-1-propylpiperidinium bromide, 1-butyl-1-methylpiperidinium bromide, 1-butyl-1-methylpiperidinium iodide, 1-methyl-1-propylpiperidinium 1-butyl-1-methylpyrrolidinium bis(trifluoromethylsulfonyl)imide, 1-methyl-1-propylpyrrolidinium bis(trifluoromethylsulfonyl)imide, 1-methyl-1-octylpyrrolidinium bis(trifluoromethylsulfonyl)imide, 1-ethyl-1-methylpyrrolidinium bis(trifluoromethylsulfonyl)imide, 1-butyl-1-methylpyrrolidinium trifluoromethanesulfonate, 1-methyl-1-propylpyrrolidinium trifluoromethanesulfonate, 1-ethyl-1-methylpyrrolidinium trifluoromethanesulfonate, 1-butyl-1-methylpyrrolidinium hexafluorophosphate, 1-methyl-1-propylpyrrolidinium hexafluorophosphate, 1-ethyl-1-methylpyrrolidinium hexafluorophosphate, 1-butyl-1-methylpyrrolidinium tetrafluoroborate, 1-methyl-1-propylpyrrolidinium tetrafluoroborate, 1-ethyl-1-methylpyrrolidinium tetrafluoroborate, 1-butyl-1-methylpyrrolidinium bromide, 1-methyl-1-propylpyrrolidinium bromide, 1-ethyl-1-methylpyrrolidinium bromide, 1-butyl-1-methylpyrrolidinium chloride, 1-methyl-1-propylpyrrolidinium chloride, 1-butyl-1-methylpyrrolidinium iodide, 1-methyl-1-propylpyrrolidinium iodide, 1-ethyl-1-methylpyrrolidinium iodide, 1-butyl-1-methylpyrrolidinium dicyanamide, 1-methyl-1-propylpyrrolidinium dicyanamide, 1-butyl-1-methylpyrrolidinium 1,1,2,2-tetrafluoroethanesulfonate, 1-methyl-1-propylpyrrolidinium 1,1,2,2-tetrafluoroethanesulfonate, 1-butyl-1-methylpyrrolidinium methylcarbonate, 1-butyl-1-methylpyrrolidinium tricyanomethanide, methyltrioctylammonium bis(trifluoromethylsulfonyl)imide, butyltrimethylammonium bis(trifluoromethylsulfonyl)imide, choline bis(trifluoromethylsulfonyl)imide, tributylmethylammonium bis(trifluoromethylsulfonyl)imide, ethylammonium nitrate, methylammonium nitrate, propylammonium nitrate, dimethylammonium nitrate, butyltrimethylammonium methylcarbonate, methyltrioctylammonium methylcarbonate, N-ethyl-N-methylmorpholinium methylcarbonate, N,N-diethyl-N-methyl-N-(2-methoxyethyl)ammonium bis(trifluoromethylsulfonyl)-imide, N,N-diethyl-N-methyl-N-(2-methoxyethyl) ammonium tetrafluoroborate, butyltrimethylammonium 1,1,2,2-tetrafluoroethanesulfonate, tetraethylammonium 1,1,2,2-tetrafluoroethanesulfonate, 2-hydroxyethylammonium formate, choline dihydrogen phosphate, methyltrioctylammonium trifluoromethanesulfonate, trihexyltetradecylphosphonium bromide, tetrabutylphosphonium bromide, tetraoctylphosphonium bromide, trihexyltetradecylphosphonium chloride, tributyltetradecylphosphonium chloride, tributylmethylphosphonium methylcarbonate, trioctylmethylphosphonium methylcarbonate, trihexyltetradecylphosphonium decanoate, trihexyltetradecylphosphonium bis(2,4,4-trimethylpentyl)phosphinate, trihexyltetradecylphosphonium dicyanamide, triisobutylmethylphosphonium tosylate, trihexyltetradecylphosphonium hexafluorophosphate, tributylmethylphosphonium methyl sulfate, tetrabutylphosphonium chloride, ethyltributylphosphonium diethyl phosphate, tributyltetradecylphosphonium dodecylbenzenesulfonate, trihexyltetradecylphosphonium bis(trifluoromethylsulfonyl) imide, tributylmethylphosphonium 1,1,2,2-tetrafluoroethanesulfonate, triethylsulfonium bis(trifluoromethylsulfonyl) imide, diethylmethylsulfonium bis(trifluoromethylsulfonyl) imide, triethylsulfonium iodide, and trimethylsulfonium iodide.

In the Na based secondary battery according to the exemplary embodiment of the present invention, the solvent of the cathode solution may further contain a heterogeneous solvent having miscibility with the above-mentioned solvent. As an example of the heterogeneous solvent, there is at least one solvent selected from a group consisting of ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, diethyl carbonate, di(2,2,2-trifluoroethyl) carbonate, dipropyl carbonate, dibutyl carbonate, ethylmethyl carbonate, 2,2,2-trifluoroethyl methyl carbonate, methylpropyl carbonate, ethylpropylcarbonate, 2,2,2-trifluoroethyl propyl carbonate, methyl formate, ethyl formate, propyl formate, butyl formate, dimethyl ether, diethyl ether, dipropyl ether, methylethyl ether, methylpropyl ether, ethylpropyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, $\gamma$-butyrolactone, 2-methyl-$\gamma$-butyrolactone, 3-methyl-$\gamma$-butyrolactone, 4-methyl-$\gamma$-butyrolactone, $\gamma$-thiobutyrolactone, $\gamma$-ethyl-$\gamma$-butyrolactone, $\beta$-methyl-$\gamma$-butyrolactone, $\gamma$-valerolactone, $\sigma$-valerolactone, $\gamma$-caprolactone, $\epsilon$-caprolactone, $\beta$-propiolactone, tetrahydrofuran, 2-methyl tetrahydrofuran, 3-methyltetrahydrofuran, trimethyl phosphate, triethyl phosphate, tris(2-chlorodethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl)sulfone, di(pentafluoroethyl) sulfone, trifluoromethyl pentafluoroethyl sulfone, trifluoromethyl nonafluorobutyl sulfone, pentafluoroethyl nonafluorobutyl sulfone, sulfolane, 3-methylsulfolane, 2-methylsulfolane, 3-ethylsulfolane, and 2-ethylsulfolane.

According to the embodiment of the present invention, as the electrochemical reaction of the battery is carried out by the active material containing the metal halide and/or the sodium halide that are dissolved in the solvent, the capacity of the battery may be designed according to the concentration of the active material containing the metal halide and/or the sodium halide that are dissolved in the solvent.

More specifically, the concentration of the active material containing the metal halide and/or the sodium halide that are dissolved in the solvent may be directly related to an amount of the material capable of participating in the electrochemical reaction of the battery and affect energy capacity per unit volume of the battery and conductivity of the ions (including sodium ions) in the liquid-state cathode.

In the Na based secondary battery according to the exemplary embodiment of the present invention, the cathode may contain the active material at a concentration of 0.1 to 1.0 M, substantially, 0.5 to 10 M, more substantially, 1 to 6 M, and most substantially 2 to 5 M.

More specifically, in the Na based secondary battery according to the exemplary embodiment of the present invention, the cathode may contain the metal halide at a concentration of 0.1 to 10 M, substantially, 0.5 to 10 M, more substantially, 1 to 6 M, and most substantially 2 to 5 M.

More specifically, in the Na based secondary battery according to the exemplary embodiment of the present invention, the liquid-state cathode may contain the metal halide at a concentration of 0.1 to 10 M, substantially, 0.5 to 10 M, more substantially, 1 to 6 M, and most substantially 2 to 5 M.

In more detail, in the Na based secondary battery according to the exemplary embodiment of the present invention, the cathode may contain the metal halide at a concentration of 0.1 to 10 M, substantially, 0.5 to 10 M, more substantially, 1 to 6 M, and most substantially 2 to 5 M based on the charge state.

In the case in which the concentration of the metal halide is less than 0.1 M based on the charge state, conductivity of the ion involved in the electrochemical reaction of the battery such as the sodium ion is excessively low, such that efficiency of the battery may be decreased, and capacity itself of the battery may be significantly low. Further, in the case in which the concentration of the metal halide is more than 10 M, conductivity of the sodium ion may be decreased by the metal ion having the same charge as that of the sodium ion. However, the ionic conductivity in the liquid-state cathode may be adjusted by further adding an additive capable of increasing conductivity of the sodium ion while not participating in a net reaction of the battery such as excess sodium halide to be described below, and the concentration of the metal halide may be adjusted according to the use of the battery and the design capacity thereof.

In the Na based secondary battery according to the exemplary embodiment of the present invention, the concentration of the sodium halide may be determined by the concentration of the metal halide in the liquid-state cathode according to the above-mentioned Reaction Formula 2, but in order to improve conductivity of the sodium ion in the cathode, the cathode may further contain sodium halide together with the metal halide.

More specifically, according to the exemplary embodiment of the present invention, when the charge and discharge reactions represented by Reaction Formulas 1 and 2 are performed, in order to improve conductivity of the sodium ion and induce more rapid charge or discharge reaction in the liquid-state cathode containing the metal ion having a predetermined concentration, the cathode may contain the sodium ion and the halide ion at concentrations higher than those determined by the discharge reaction according to the Reaction Formula 2.

Therefore, the cathode may contain the metal halide and sodium halide that are dissolved in the solvent. In detail, the liquid-state cathode in the charge state may contain the metal halide and sodium halide that are dissolved in the solvent, that is, the liquid-state cathode in the charge state may contain the metal ion, the sodium ion, and the halide ion.

In the Na based secondary battery according to the exemplary embodiment of the present invention, the cathode (liquid-state cathode) in the charge state may further contain 0.1 to 3 M of sodium halide based on 1 M of the metal halide. Through the amount (molar ratio) of the sodium halide based on the metal halide, conductivity of the sodium ion in the liquid-state cathode and the liquid component of the cathode may be improved, and the charge and discharge reaction of Reaction Formulas 1 and 2 may be rapidly and effectively carried out. Further, conductivity of the sodium ion and a reaction rate may be secured even though an operation temperature of the battery is low.

In describing the Na based secondary battery according to the exemplary embodiment of the present invention, for clear understanding, the cathode and the charge and discharge reaction are described based on the reaction products or materials (the sodium halide, the metal halide, or the like) at the time of charge and discharge reaction of Reaction Formulas 1 and 2. However, according to the present invention, as all of the reaction products of the sodium halide and the metal halide except for the electroplated metal exist in a state in which the reaction products are dissolved in the solvent, the sodium halide may be interpreted as the sodium ion and halide ion, and the metal halide may be interpreted as ions of at least one metal selected from the group consisting of the transition metals and Groups 12 to 14 metals and the halide ion.

In view of ions, in the Na based secondary battery according to the exemplary embodiment of the present invention, the liquid-state cathode may contain the metal ion at a concentration of 0.1 to 10 M, substantially, 0.5 to 10 M, more substantially, 1 to 6 M, and most substantially 2 to 5 M. In more detail, the liquid-state cathode may contain the metal ion at a concentration of 0.1 to 10 M, substantially, 0.5 to 10 M, more substantially, 1 to 6 M, and most substantially 2 to 5 M, based on the charge state. In this case, as described above, the molar concentration of the metal ion may be the concentration of the metal ion contained in the liquid-state cathode based on the charge state.

In view of ions, a configuration in which the cathode further contains sodium halide together with the metal halide in order to improve conductivity of the sodium ion may be interpreted as follows. In order to improve conductivity of the sodium ion, the liquid-state cathode or the liquid component of the cathode may further contain the sodium ion, which may be interpreted as that the cathode may further contain the halide ion corresponding to the amount of sodium ion. In detail, the liquid-state cathode may contain the metal ion, the sodium ion and the halide ion based on the charge state. More specifically, the liquid-state cathode may contain the halide ion at a molar concentration calculated by adding the product of the molar concentration of the metal ion and a valence (ionic valence) of the metal ion to the molar concentration of the sodium ion.

This may be represented by the following Reaction Formula 3 based on Reaction Formulas 1 and 2. That is, in the charge and discharge reaction of Reaction Formula 3, the sodium halide that is not involved in the net reaction of the battery may be dissolved in the solvent of the cathode in both of the charge and discharge states.

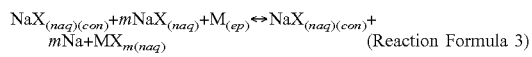
(Reaction Formula 3)

In Reaction Formula 3, '(naq)' means a state in which the material is dissolved in the solvent, '(con)' means sodium halide that is not involved in the net charge and discharge reaction, that is, excess sodium halide based on the battery reaction, '(ep)' means electroplating by the discharge reaction of the battery. In this case, the halogen atom (ion) of the excess sodium halide based on the net reaction (Reaction Formulas 1 and 2) may be a halogen atom (ion) equal to or different from the halogen atom (ion) involved in the net reaction.

As described above, the secondary battery according to the exemplary embodiment of the present invention based on the injected raw materials or the reaction products may be interpreted in view of ions, and a scope of the present invention may also be interpreted in view of ions. Hereinafter, for more clear understanding, the secondary battery according to the exemplary embodiment of the present invention will be described again based on the raw materials or the reaction products.

In the Na based secondary battery according to the exemplary embodiment of the present invention, the metal halide may be a metal halide defined as the following Chemical Formula 1.

 (Chemical Formula 1)

In Chemical Formula 1, M may be at least one selected from nickel (Ni), iron (Fe), copper (Cu), zinc (Zn), cadmium (Cd), titanium (Ti), aluminum (Al), and tin (Sn), X is at least one selected from iodine (I), bromine (Br), chlorine (Cl), and fluorine (F), and m is a natural number of 1 to 4. Here, m may be a natural number corresponding to the valence of the metal.

In the Na based secondary battery according to the exemplary embodiment of the present invention, the sodium halide may be a halide defined by the following Chemical Formula 2.

 (Chemical formula 2)

In Chemical Formula 2, X is at least one selected from iodine (I), bromine (Br), chlorine (Cl), and fluorine (F).

The sodium halide dissolved in the solvent may be formed by a bond between the halogen atom of the metal halide and the sodium in the discharge state of the battery. Therefore, X of Chemical Formula 2 may be the same as X of Chemical Formula 1.

The Na based secondary battery according to the exemplary embodiment of the present invention may further include a cathode current collector. More specifically, in the Na based secondary battery according to the exemplary embodiment of the present invention, the cathode may further include the cathode current collector contacting the active material involved in the charge and discharge of the battery to collect current and providing a current movement path to the outside. In this case, the cathode current collector contacts the active material, which may be a meaning including a structure in which the cathode current collector is impregnated into the liquid-state cathode or the liquid component of the cathode.

More specifically, the cathode current collector may be a porous conductor. In more detail, the cathode current collector may be foam, a film, a mesh, a felt, or a perforated film, which is made of a conductive material. More specifically, the cathode current collector may be a conductive material that has excellent conductivity and is chemically stable at the time of charging and discharging the battery such as graphite, graphene, titanium, copper, platinum, aluminum, nickel, silver, gold, or carbon nanotube and be foam, a film, a mesh, a felt, or a perforated film, which is made of the conductive material as described above. In addition, the cathode current collector may be a composite coated or laminated by different conductive materials.

In detail, at the time of the discharge reaction, the metal of the metal halide dissolved in the solvent is electroplated, and the electroplated metal is again dissolved in the solvent at the time of the charge reaction. In this case, the electroplating and the dissolution as described above may be preferably performed at a region at which the metal contacts an electron source (and/or sink). To this end, the cathode current collector may be the same material as the metal of the metal halide or be foam, a film, a mesh, felt, or a perforated film of the conductive material on which a surface layer made of the same material is formed.

In the Na based secondary battery according to the exemplary embodiment of the present invention, the anode may contain an anode active material containing sodium, wherein the anode active material may contain a sodium metal or a sodium alloy. As a non-restrictive example, the sodium alloy may be an alloy of sodium and cesium, an alloy of sodium and rubidium, or a mixture thereof. The anode active material may be a solid-state material or a liquid-state material including a molten state material at the operation temperature of the battery. Here, in order to allow the battery to have capacity of 50 Wh/kg or more, the anode active material may be molten sodium (Na), and the operation temperature of the battery may be 98 to 200° C., substantially 98 to 150° C., more substantially 98 to 130° C.

In the Na based secondary battery according to the exemplary embodiment of the present invention, as the solid electrolyte provided between the cathode and the anode, any material may be used as long as the material may physically separate the cathode and the anode from each other and have selective conductivity for the sodium ion. Therefore, a solid electrolyte generally used for selective conduction of the sodium ion in a battery field may be used. As a non-restrictive example, the solid electrolyte may be Na super ionic conductor (NASICON), β-alumina, or β"-alumina. As a non-restrictive example, the NASICON may include Na—Zr—Si—O based complex oxide, Na—Zr—Si—P—O based complex oxide, Y-doped Na—Zr—Si—P—O based complex oxide, Fe-doped Na—Zr—Si—P—O based complex oxide, or a mixture thereof. In detail, the NASICON may include $Na_3Zr_2Si_2PO_{12}$, $Na_{1+x}Si_xZr_2P_{3-x}O_{12}$ (x is a real number satisfying the following inequality: 1.6<x<2.4), Y- or Fe-doped $Na_3Zr_2Si_2PO_{12}$, Y- or Fe-doped $Na_{1+x}Si_xZr_2P_{3-x}O_{12}$ (x is a real number satisfying the following inequality: 1.6<x<2.4), or a mixture thereof.

In the Na based secondary battery according to the exemplary embodiment of the present invention, the Na based secondary battery may have a plate type battery structure including a plate shaped solid electrolyte and a tube type battery structure including a tube shaped solid electrolyte having a closed one end, based on a shape of the solid electrolyte separating the anode and the cathode to partition off an anode space from a cathode space.

Hereinafter, a structure of a Na based secondary battery according to an exemplary embodiment of the present invention will be described in detail with reference to FIG. 1, based on the case in which the anode active material is molten sodium, but the present invention is not limited to a physical shape of the battery to be described below. In addition, the Na based secondary battery according to the present invention may have a structure of a general Na based secondary battery.

FIG. 1 is a view showing an example of the structure of the Na based secondary battery according to the exemplary embodiment of the present invention. As shown in FIG. 1, the Na based secondary battery according to the exemplary embodiment of the present invention may include a cylindrical metal housing 100 having a closed lower end and an opened upper end, a solid electrolyte (hereinafter, solid electrolyte tube 300) sequentially positioned in the metal housing 100 from an outer side of the metal housing 100 toward an inner side thereof and having a closed lower end in a tube shape, a safety tube 410, and a wicking tube 420.

Particularly, the wicking tube 420 positioned at the innermost portion, that is, the center of the metal housing 100, may have a tube shape in which a through hole 1 formed at a lower end thereof, and the safety tube 410 may be positioned at an outer side of the wicking tube 420 and have a structure in which the safety tube 410 encloses the wicking tube 420 while being spaced apart from the wicking tube 420 by a predetermined distance.

An anode 400 including molten sodium is provided in the wicking tube 420 and has a structure in which it fills an empty space between the wicking tube 420 and the safety tube 410 through the through-hole 1 formed at the lower portion of the wicking tube 420.

A dual structure of the wicking tube 420 and the safety tube 410 is a structure in which a violent reaction between cathode materials and anode materials may be prevented at the time of damage of the solid electrolyte tube 300 and a level of the molten sodium may be constantly maintained by capillary force even at the time of discharge.

The solid electrolyte tube 300 is positioned at the outer side of the safety tube 410 so as to enclose the safety tube 410 and may be the tube shaped solid electrolyte having selective permeability to the sodium ion ($Na^+$).

A liquid-state cathode 220 and a cathode current collector 210 may be provided between the solid electrolyte tube 300 enclosing the safety tube 410 and the metal housing 100.

That is, the Na based secondary battery according to the exemplary embodiment of the present invention may have a concentric structure in which the wicking tube 420, the safety tube 410, the solid electrolyte tube 300, and the metal housing 100 are sequentially disposed from the inner side toward the outer side. Here, the anode 400 containing the molten sodium may be filled in the wicking tube 420, the liquid state cathode 220 containing the metal halide may be provided in the space between the solid electrolyte tube 300 and the metal housing 100, and the cathode current collector 210 may be provided so as to be impregnated into the liquid-state cathode 220.

As shown in FIG. 1, the cathode current collector 210 may be rolled and provided between the solid electrolyte tube 300 and the metal housing 100, but the present invention is not limited by a shape of the current collector.

In addition, the Na based secondary battery according to the exemplary embodiment of the present invention may further include a cover 110 positioned at an upper portion of the metal housing 100 to close an inner portion of the metal housing, insulator 120 having a ring shape and positioned at an upper side of the metal housing 100 to electrically insulate between the metal housing 100 and the solid electrolyte tube 300, and an electrode terminal 130 positioned at a circumference of an upper end of the metal housing 100. Further, in order to minimize evaporation of liquid-state components, immediately after manufacturing the battery, internal pressure of the battery closed by the cover 110 may be 15 psi or more, and the cathode current collector 210 may be electrically connected to the metal housing 100. Further-more, a general anode current collector may be input through a through-hole of the cover 110 so as to be impregnated into the anode active material including the molten sodium filled in the wicking tube 420 at a predetermined region.

In actually fabricating the Na based secondary battery according to the exemplary embodiment of the present invention, the Na based secondary battery may be fabricated by injecting raw materials at a predetermined quantity based on the charge state or the discharge state. However, this difficulty in a fabrication method only affects a state immediately after fabrication before the battery is charged or discharged and does not affect a state in which the battery is charged and discharged and normally operates. In addition, the fabrication method may be selected in consideration of easiness and convenience of fabrication.

Figure 2A:
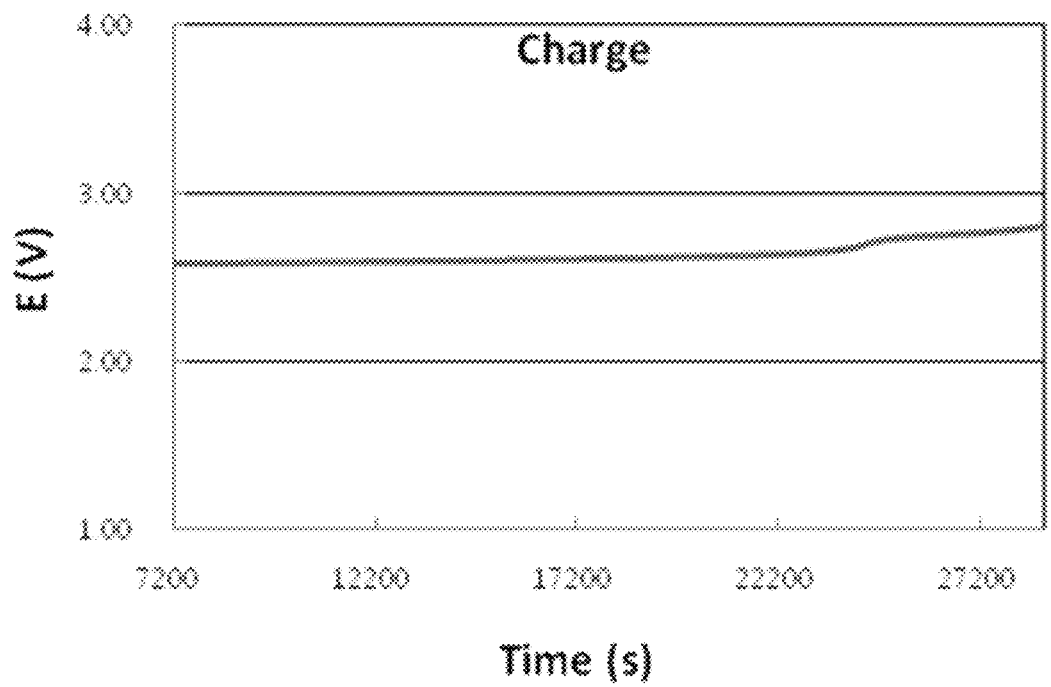
FIG. 2A is a view showing charge characteristics of a Na based secondary battery fabricated according to the embodiment of the present invention.
Figure 2B:
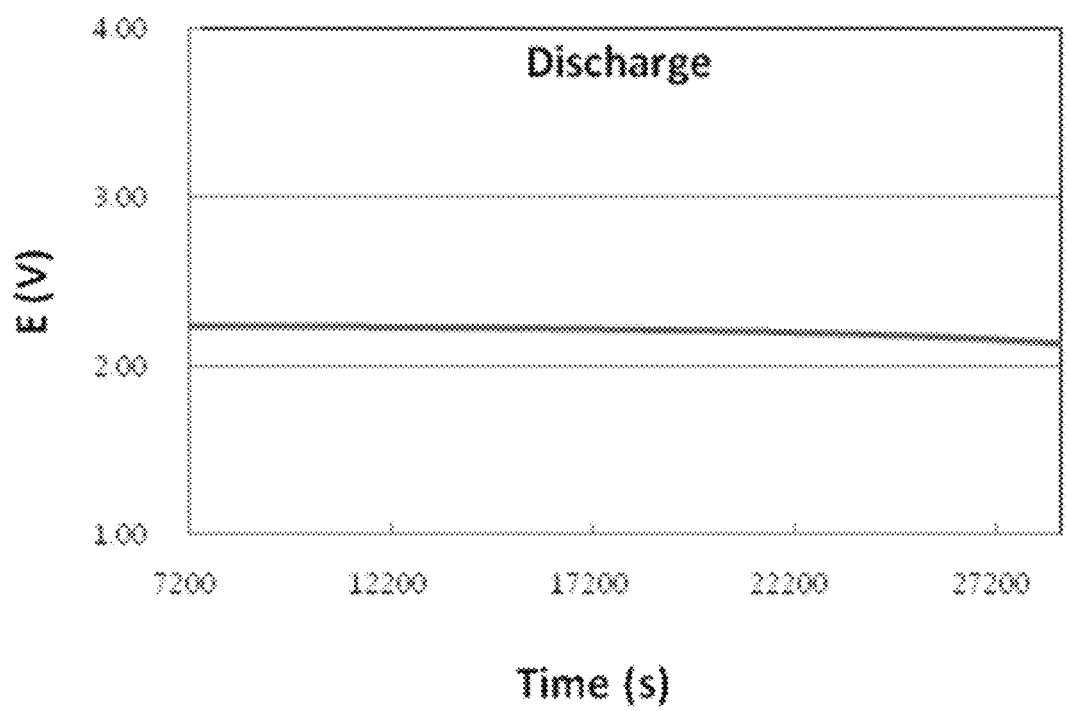
FIG. 2B is a view showing discharge characteristics thereof.

FIGS. 2A and 2B are views showing charge and discharge characteristics of a Na based secondary battery fabricated according to the exemplary embodiment of the present invention. In detail, 50 g of sodium iodide (NaI) was dissolved in 50 g of ethylene glycol as a solvent of a cathode to prepare a liquid-state component, and graphite felt coated with 2 g of nickel and having a thickness of 10 mm was used as a cathode current collector. In addition, 0.5 g of sodium metal was cut in a glove box under argon atmosphere (<1 ppm $O_2$ and <1 ppm $H_2O$) to be used as an anode. Circular flat disc shaped NASICON having selective conductivity for sodium ion was used and positioned in a glove box under argon atmosphere (<1 ppm $O_2$ and <1 ppm $H_2O$) before 48 hours to allow oxygen and water to be sufficiently removed.

At the time of fabricating the Na based secondary battery, after metal sodium was put into a metal vessel made of stainless steel and allow one surface of the metal sodium and NASICON to contact each other, sealability was maintained by pressing the sodium vessel and NASICON using an O-ring, a bolt and a nut. The cathode current collector was connected to a vessel made of stainless steel having an inner portion coated with Teflon through a bolt. 10 g of the prepared liquid-state component was injected into the vessel filled with the cathode current collector-coated with nickel. A chamber filled with the cathode current collector and liquid-state cathode active material was sealably assembled with a chamber filled with the metal sodium in a state in which pressure of 20 psi was applied thereto, having the NASICON therebetween.

The fabricated cell was charged and discharged at 120° C. and 20 mA for 6 hours, and then voltage thereof was measured. As shown in FIG. 2A, the nickel metal was ionized to be dissolved in a solution at the time of charging the battery, such that the voltage was slightly increased, and as shown in FIG. 2B, the battery operated in a shape in which nickel was attached to the current collector in a metal form at the time of discharging the battery.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scopes and spirit of the invention.

The invention claimed is:

1. A Na based secondary battery comprising:
an anode containing sodium or a sodium alloy;
a cathode containing metal halide, wherein the metal halide comprises sodium metal halide and a halide of at least one metal selected from a group consisting of transition metals, and Groups 12 to 14 metals, a solvent dissolving the metal halide, and
a sodium ion conductive solid electrolyte separating the cathode and the anode from each other,
wherein the secondary battery is charged by a charge reaction according to the following Reaction Formula 1 and discharged by a discharge reaction according the following Reaction Formula 2

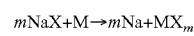  (Reaction Formula 1)

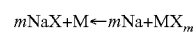  (Reaction Formula 2)

wherein M is at least one metal selected from a group consisting of a group consisting of the transition metals and Groups 12 to 14 metals, X is a halogen atom, and m is a natural number of 1 to 4,
in which sodium halide (NaX) and metal halide ($MX_m$) of Reaction Formula 1 and 2 are dissolved by the solvent at the time of charging and discharging; and
the cathode further comprises excess NaX (naq)(con) wherein the halide ion X is the same or different from a halide ion of Reaction Formula 1 or 2, and
wherein (naq) means the NaX is dissolved in the solvent, and (con) means the NaX does not participate in the charge and discharge reaction of Formulas 1 and 2.

2. The Na based secondary battery of claim 1, wherein in a discharge state, the cathode includes:
a liquid-state component containing sodium halide; and
a solid-state component containing at least one metal selected from a group consisting of the transition metals and Groups 12 to 14 metals.

3. The Na based secondary battery of claim 1, wherein the solvent dissolves the entire metal halides.

4. The Na based secondary battery of claim 1, wherein the cathode is in an entirely liquid state in a charge state.

5. The Na based secondary battery of claim 1, further comprising a cathode current collector contacting the cathode to collect current and providing a current movement path to the outside.

6. The Na based secondary battery of claim 5, wherein the cathode current collector contains at least one material selected from graphite, graphene, titanium, copper, platinum, aluminum, nickel, silver, gold, and carbon nanotube.

7. The Na based secondary battery of claim 1, wherein M is at least one selected from nickel (Ni), iron (Fe), copper (Cu), zinc (Zn), cadmium (Cd), titanium (Ti), aluminum (Al), and tin (Sn), X is at least one selected from iodine (I), bromine (Br), chlorine (Cl), and fluorine (F).

8. The Na based secondary battery of claim 1, wherein the cathode contains the metal halide at a concentration of 0.5 to 10 M.

9. The Na based secondary battery of claim 1, wherein the sodium alloy is a sodium-cesium alloy, a sodium-rubidium alloy, or a mixture thereof.

10. The Na based secondary battery of claim 1, wherein the solid electrolyte is beta alumina or Na super ionic conductor (NASICON).

11. The Na based secondary battery of claim 1, wherein an operation temperature of the Na based secondary battery is room temperature to 200° C.

12. The Na based secondary battery of claim 1, wherein the solvent is a non-aqueous organic solvent, an ionic liquid, or a mixture thereof.

13. The Na based secondary battery of claim 12, wherein the solvent is at least one selected from a group consisting of 1,2-ethanediol, 1,2-propanediol, 1,3-propanediol, 1,2-butanediol, 1,3-butandiol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, glycerol, ethylene glycol, diethylene glycol, triethylene glycol, tetraethylene glycol, polyethylene glycol, propylene glycol, dipropylene glycol, tripropylene glycol, polypropylene glycol, formamide, N,N-dimethyl formamide, N,N-dimethyl acetamide, N,N-diethyl acetamide, N,N-dimethyl trifluoroacetamide, hexamethylphosphoramide, acetonitrile, propionitrile, butyronitrile, α-terpineol, β-terpincol, dihydro terpineol, N-methyl-2-pyrrolidone (NMP), dimethylsulfoxide, pyrrolidine, pyrroline, pyrrole, 2H-pyrrole, 3H-pyrrole, pyrazolidine, imidazolidine, 2-pyrazoline, 2-imidazoline, 1H-imidazole, triazole, isoxazole, oxazole, thiazole, isothiazole, oxadiazole, oxatriazole, dioxazole, oxazolone, oxathiazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pteridine, phenazine, phenothiazine, phenoxazine, and acridine.

14. A Na based secondary battery comprising:
an anode containing sodium or a sodium alloy;
a cathode containing metal halide, wherein the metal halide comprises sodium metal halide and a halide of at least one metal selected from a group consisting of transition metals, and Groups 12 to 14 metals, a solvent dissolving the metal halide, and a sodium ion conductive solid electrolyte separating the cathode and the anode from each other,
wherein the secondary battery is charged by a charge reaction according to the following Reaction Formula 1 and discharged by a discharge reaction according the following Reaction Formula 2

$$mNaX+M \rightarrow mNa+MX_m \qquad \text{(Reaction Formula 1)}$$

$$mNaX+M \leftarrow mNa+MX_m \qquad \text{(Reaction Formula 2)}$$

wherein M is at least one metal selected from a group consisting of a group consisting of the transition metals and Groups 12 to 14 metals, X is a halogen atom, and m is a natural number of 1 to 4, in which sodium halide (NaX) and metal halide ($MX_m$) of Reaction Formula 1 and 2 are dissolved by the solvent at the time of charging and discharging; and
wherein the cathode is in an entirely liquid state in a charge state, and
wherein the cathode contains the metal halide at a concentration of 0.1 to 10 M.

* * * * *